United States Patent [19]
Diaz

[11] Patent Number: 4,518,576
[45] Date of Patent: May 21, 1985

[54] H₂S REMOVAL FROM GAS STREAMS

[75] Inventor: Zaida Diaz, Houston, Tex.

[73] Assignee: Shell Oil Company, Houston, Tex.

[21] Appl. No.: 563,476

[22] Filed: Dec. 20, 1983

[51] Int. Cl.³ .................. B01D 53/34; C01B 17/05
[52] U.S. Cl. .................. 423/573 R; 423/221;
423/223; 423/224; 423/226; 23/293 S; 252/189;
252/192
[58] Field of Search ............ 423/221, 223, 224, 226,
423/567 R, 573 R, 573 G, 578 R; 23/293 S;
252/189–192

[56] References Cited
U.S. PATENT DOCUMENTS

| | | | |
|---|---|---|---|
| 3,068,065 | 12/1972 | Hartley et al. | 423/228 |
| 3,933,993 | 1/1976 | Salemme | 423/573 |
| 4,009,251 | 2/1977 | Meuly | 423/573 G |
| 4,356,155 | 10/1982 | Blytas et al. | 423/226 |
| 4,382,918 | 5/1983 | Diaz | 423/573 R |
| 4,421,733 | 12/1983 | Blytas | 423/573 R |

Primary Examiner—Earl C. Thomas
Attorney, Agent, or Firm—Albert J. Adamcik

[57] ABSTRACT

A cyclic process and composition for the removal of hydrogen sulfide from a variety of gas streams is disclosed. The gas stream containing the sour gases is contacted with a specified reactant solution and a combination crystal modifier of phosphate and thiosulfate ions. The hydrogen sulfide is converted to sulfur, and the reactant is reduced. The process includes sulfur removal and regeneration of the reactant.

12 Claims, 2 Drawing Figures

H₂S REMOVAL FROM GAS STREAMS

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior to or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

A problem associated with such processes is that the solid sulfur produced, if special measures are not taken, may be of poor quality, i.e., it may be finely divided and difficult to separate from the aqueous reactant solution. For example, U.S. Pat. No. 4,356,155 (Blytas and Diaz) details a process of the type described in which specified alcohols are employed to improve sulfur quality. The invention also seeks to overcome this problem, and to provide an efficient and economic process for $H_2S$ removal.

SUMMARY OF THE INVENTION

Accordingly, the invention, in one embodiment, relates to a process for the removal of $H_2S$ from a sour gaseous stream comprising contacting the sour gaseous stream in a contacting zone with an aqueous reaction solution at a temperature below the melting point of sulfur, the reaction solution comprising an effective amount of an oxidizing polyvalent metal chelate of an acid having the formula

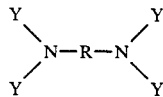

wherein
from two to four of the groups Y are selected from acetic and propionic acid groups;
from zero to two of the groups Y are selected from 2-hydroxyethyl, 2-hydroxy propyl, and

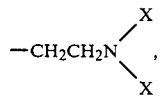

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, the phosphate and thiosulfate ions being present in a molar ratio of from 0.5 to 3:1.

A sweet gas stream is produced, and an aqueous admixture containing crystalline sulfur and a reduced reactant is removed from the contact zone. At least a portion of the sulfur crystals may be removed before regenerating the reactant, or at least a portion of the sulfur crystals may be removed after regeneration. The sulfur crystals obtained, due to the presence of the modifier combination, are of improved quality, i.e., they have increased size, and, thus, improved filterability. The reduced reactant is regenerated, preferably by contacting the mixture in a regeneration zone or zones with oxygen. The term "oxygen", as used herein, includes oxygen-containing gases, such as air or air-enriched with oxygen. The oxygen oxidizes the reduced metal ions of the chelate to the higher valence state, and the regenerated mixture is returned to the contact zone. Electrochemical regeneration may also be employed.

In another embodiment of the invention, a sour gaseous stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), an effective amount of the polyvalent metal chelate, as mentioned, and a modifying amount of the modifiers described. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate. In the process, the ions of the chelate are reduced, and the sulfur may be treated, as described, supra. As in the previous embodiment, the sulfur crystals may be removed prior to or subsequent to a regeneration of the admixture, and the crystals produced will be of increased size. Preferably, if the volume of $CO_2$ absorbed is large, the reactant-containing solution is treated, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As indicated, above, the invention also provides in this embodiment for the regeneration of the reactant and the absorbent. Preferably, the loaded absorbent mixture and the reduced polyvalent metal chelate are regenerated by contacting the mixture in a regeneration zone or zones with an oxygen-containing gas. The oxygen-containing gas may be air, oxygen, or air-enriched with oxygen. The oxygen-containing gas accomplishes two functions, the stripping of the $CO_2$ from the loaded absorbent mixture, and the oxidation of the reduced reactant to a higher oxidation state. The oxygen (in whatever form supplied) is supplied in a stoichiometric equivalent or excess with respect to the amount of reactant present in the mixture. Preferably, the oxygen-containing gas is supplied in an amount of from about 1.2 to 3 times excess.

In yet another embodiment, the invention relates to a composition for use in aqueous solutions for removing $H_2S$ from sour gaseous streams, the composition comprising (A) a polyvalent metal chelate of an acid having the formula

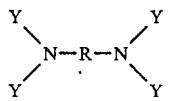

wherein
from two to four of the groups Y are selected from acetic and propionic acid groups;
from zero to two of the groups Y are selected from 2-hydroxyethyl, 2-hydroxy propyl, and

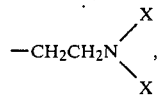

wherein
X is selected from acetic acid and propionic acid groups; and
R is ethylene, propylene or isopropylene or alternatively cyclohexane or benzene where the two hydrogen atoms replaced by nitrogen atoms are in the 1,2 position, and mixtures thereof;
(B) an alkali metal or ammonium phosphate, polyphosphate, -hydrogen or -dihydrogen phosphate; and (C) an alkali metal thiosulfate, bisulfite, dithionite or tetrathionite, the molar ratio of (A) to (C) being from about 1 to 6:1, and the molar ratio of (B) to (C) being from about 0.5 to 3:1. Other aspects of the invention will become apparent to those skilled in the art.

DETAILED DESCRIPTION OF THE INVENTION

Figure 1:
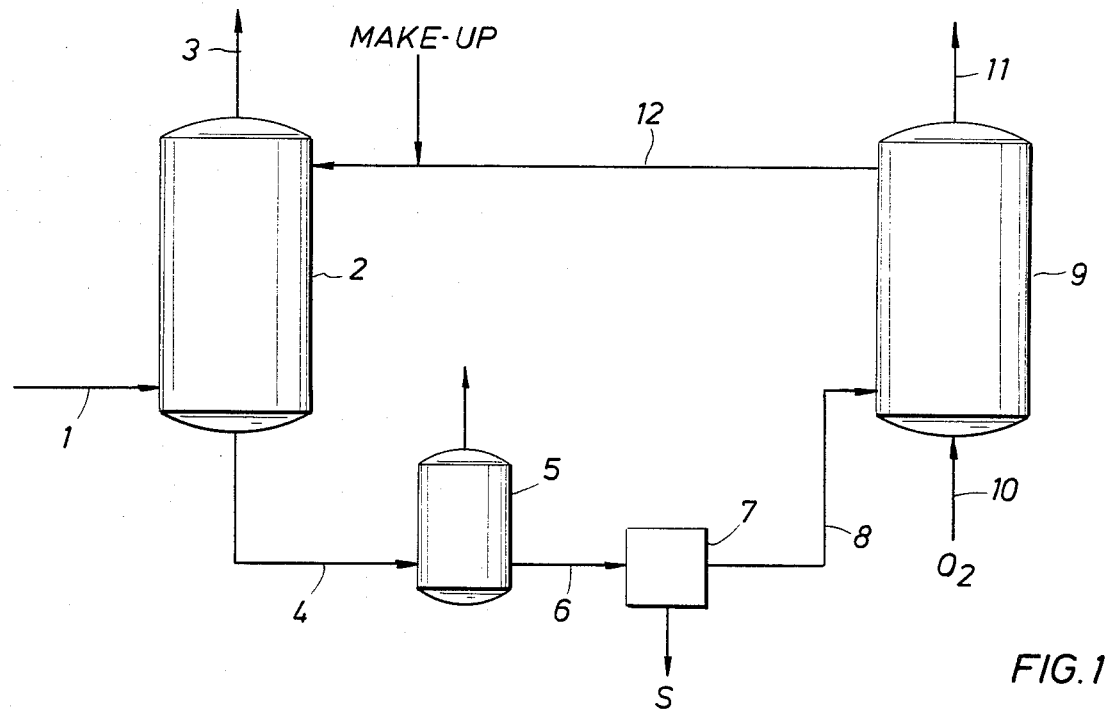

The particular type of gaseous stream treated is not critical, as will be evident to those skilled in the art. Streams particularly suited to removal of $H_2S$ and $CO_2$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon streams", as employed herein, is intended to include streams containing significant quantities of hydrocarbon (both paraffinic and aromatic), it being recognized that such streams contain significant "impurities" not technically defined as hydrocarbon. Again, streams containing principally a single hydrocarbon e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, and may range from about 0.5 percent to over 99 percent by volume. Obviously, the amounts of $H_2S$ and $CO_2$ present are not generally a limiting factor in the practice of the invention.

The temperatures employed in the contacting or absorption-contact zone are not generally critical, except that the reaction is carried out at a temperature below the melting point of sulfur, and, if an absorbent is used, they must permit acceptable absorption of $CO_2$. In many commercial applications, such as the removal of $H_2S$ and $CO_2$ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds or longer, with contact times of 2 seconds to 120 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, which disclosures are incorporated herein by reference. If the reactant employed is the ferric chelate of N-(2-hydroxyethyl ethylenediamine triacetic acid), pH in the process of the invention will preferably range from about 6 to about 7. The procedure is preferably conducted continuously.

As indicated, the $H_2S$, when contacted, is quickly converted by the polyvalent metal chelate to elemental sulfur. The amount of polyvalent metal chelate compound(s) supplied is an effective amount, i.e., an amount sufficient to convert all or substantially all of the $H_2S$ in the gas stream, and will generally be on the order of at least about two mols per mol of $H_2S$. Ratios of from about 1 or 2 mols to about 15 mols of chelate per mol of $H_2S$ may be used, with ratios of from about 2 mols per mol to about 5 mols of chelate per mol of $H_2S$ being preferred. The manner of preparing the admixture containing an absorbent is a matter of choice. For example, the polyvalent metal chelate(s) may be added to the absorbent, and, if necessary, then water added. The amount of water added will normally be just that amount necessary to achieve solution of the chelate(s), and can be determined by routine experimentation. Since the chelate(s) may have a significant solubility in the solvent, and since water is produced by the reaction of the $H_2S$ and the chelate(s), precise amounts of water to be added cannot be given. In the case of absorbents having a low solubility for the chelate(s), approximately 5 percent to 10 percent water by volume, based on the total volume of the absorbent mixture, will generally provide solvency. Preferably, however, the polyvalent metal chelate or chelates are added as an aqueous solution to the liquid absorbent. Where the chelate is supplied as an aqueous solution, the amount of solution supplied may be about 20 percent to about 80 percent by volume of the total absorbent admixture supplied to the absorption zone. The solution will generally be supplied as an aqueous solution having a concentration of from about 0.1 molar to about 3 molar, and a concentration of about 1.0 molar is preferred.

Any oxidizing polyvalent metal, or mixture thereof may be employed as the oxidizing ions of the chelate compound(s), but iron, copper, and manganese are preferred, particularly iron. The polyvalent metal should be capable of oxidizing hydrogen sulfide, while being reduced itself from a higher to a lower valence state, and should then be oxidizable from the lower valence state to the higher valence state in a typical redox reaction. Other polyvalent metals which may be used include lead, mercury, palladium, platinum, tungsten, nickel, chromium, cobalt, vanadium, titanium, tantalum, zirconium, molybdenum, and tin.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the reactant and which exhibit sufficient solubility for the reactant or reactants may be employed. As indicated, the absorbent preferably has good absorbency for $H_2S$ as well, in order to assist in the removal of any $H_2S$ present in the gaseous stream. The particular absorbent chosen is a matter of choice, given these qualifications, and selection can be made by routine experimentation. For example, diethylene glycol monoethyl ether, propylene carbonate, tetraethylene glycol-dimethyl ether, N-methyl pyrrolidone, sulfolane, methyl isobuty ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

The solution containing the modifying ions or compositions may be prepared in any suitable fashion. Preferably, the polyvalent metal chelate(s) may be dissolved, as described above, and the phosphorus-containing material and the thiosulfate, or precursor thereof, may be added. Alternatively, the phosphorus-containing material may be provided in water, and the chelate, etc., may be added.

Again, the composition of the invention, as described, supra, may be utilized, it being understood that such a composition can simply be added to water. The composition may contain the oxidized or the reduced chelates (or mixtures thereof), those skilled in the art recognizing that the reduced chelate may be employed simply by "regenerating" or oxidizing the solution. If a mixture of the components of the composition of the invention is dissolved in water, the water can be evaporated to dryness by heating and/or reduced pressure, leaving the claimed composition as a dry solid. This dry solid possesses the same properties as the original mixture.

The modifiers, i.e., the phosphate ions and thiosulfate ions, are supplied in an amount effective to improve the quality of the sulfur produced. Within the general ratios mentioned, supra, the amount to be employed may be determined by experimentation, it being observed generally that the modifier will normally be present in a range of from about 0.05 to 1 mole of phosphate per liter, and from about 0.05 to 1 mole of thiosulfate per liter.

Any suitable sources of phosphate and thiosulfate ions may be employed. Such materials include, but are not limited to, sodium, potassium, and lithium phosphate, polyphosphate, -hydrogen or -dihydrogen phosphate, and mixtures thereof, and sodium, potassium, or lithium thiosulfate, bisulfite, dithionite, or tetrathionate, and mixtures thereof. The term "polyphosphate", as used herein, is understood to include ortho- or metaphosphates and mixtures thereof, and the various phosphoric acids may be employed. The ratios of the various components are as provided, supra.

The manner of recovering the sulfur crystals is a matter of choice. For example, the crystals may be recovered by settling, filtration, liquid flotation, or by suitable devices such as a hydroclone, etc.

In order to describe the invention in greater detail, reference is made to the accompanying schematic drawing. The values given herein relating to temperatures, pressures, compositions, etc., are calculated or merely exemplary and should not be taken as delimiting the invention.

Figure 2:
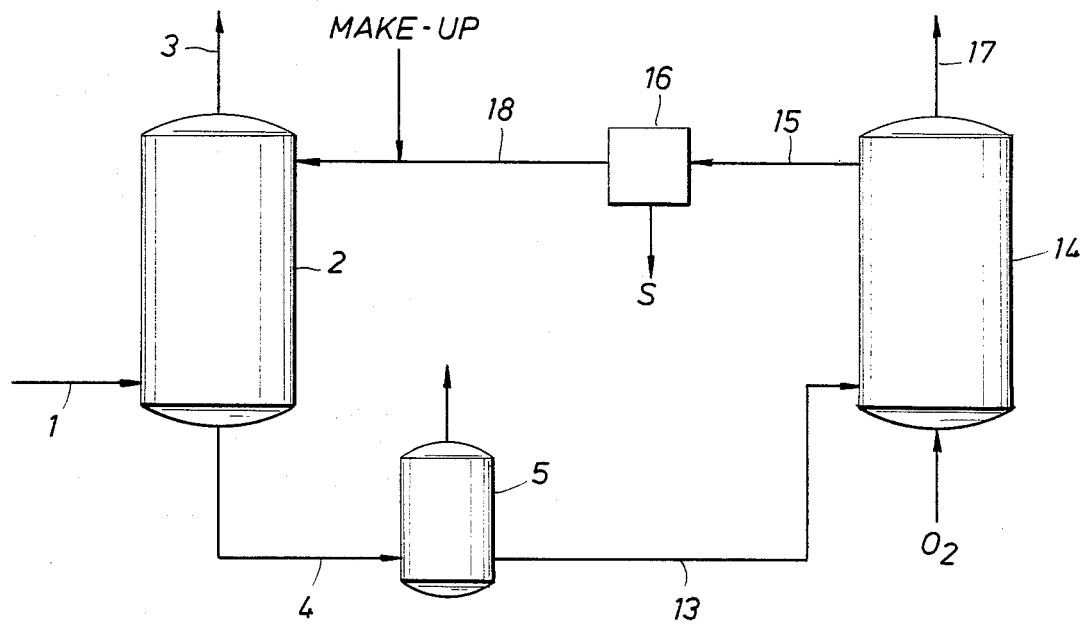

FIG. 1 illustrates the first embodiment of the invention, wherein sulfur is removed prior to regeneration, while FIG. 2 illustrates the removal of the sulfur after regeneration.

In FIG. 1, sour gas, e.g., natural gas containing about 0.5 percent by volume $H_2S$, in line (1) enters contactor or column (2) (tray type) into which also enters, from line (12), an aqueous admixture comprising an aqueous 1.0M solution of the Fe(III) chelate of N-(2-hydroxyethyl)ethylene diamine triacetic acid having a pH of 6, the solution further containing phosphate ion, added as 0.5 moles per liter of disodium hydrogen phosphate heptahydrate, and thiosulfate ion, added as 0.5 moles per liter of sodium thiosulfate pentahydrate. The pressure of the feed gas is about 1200 p.s.i.g., and the temperature of the aqueous admixture is about 35° C. A contact time of about 120 seconds is employed in order to react all the $H_2S$. Purified or "sweet" gas leaves column (2) through line (3). The "sweet" gas is of a purity sufficient to meet standard requirements.

In the admixture, the $H_2S$ is converted to elemental sulfur by the Fe(III) chelate, the Fe(III) chelate in the process being converted to the Fe(II) chelate. The aqueous admixture containing elemental sulfur is removed continuously and sent through line (4) to a depressurization and degassing unit (5), and then through line (6) to sulfur recovery unit (7). Sulfur recovery unit (7) may be of any suitable type. Preferably, unit (7) comprises a filtration unit. It is not necessary that all the sulfur be removed in the sulfur recovery step, and some sulfur retention may be beneficial. The type of unit chosen is thus flexible. Preferably, the amount of sulfur removed in the separation step is simply balanced with the rate of sulfur intake in reactor (2), which is of course, dependent on the amount of $H_2S$ in gas stream (1). Those skilled in the art may adjust the appropriate rates of withdrawal of the streams. From unit (7), the sulfur-free or substantially sulfur-free solution is sent via line (8) to regeneration zone (9). In regeneration zone or column (9), the admixture is contacted with excess air from line (10) to convert Fe(II) chelate in the admixture to the Fe(III) chelate. The temperature of the regeneration column is about 35° C., and pressure in the column is maintained at about 2 atmospheres. Spent air is removed from column (9) through line (11), while regenerated aqueous admixture is returned via line (12) to contactor (2).

As indicated, FIG. 1 illustrates the aspect of the invention wherein the sulfur recovery is carried out prior to regeneration. Removal of the sulfur after regeneration may be preferred in some instances, and may be accomplished by positioning of the sulfur recovery unit "after" the regeneration zone. Thus, in a separate embodiment, regenerated liquid, still containing sulfur, may be passed to units analogous or equivalent to unit (7), sulfur recovered, and regenerated sulfur-free solution returned to contactor (2).

Accordingly, in FIG. 2, apparatus elements 1 through 4 correspond to similarly numbered elements shown in FIG. 1. The sulfur-containing liquid is passed, after degassing in (5), via line (13) to regenerator (14) where it is regenerated with air as previously described. The regenerated sulfur containing admixture is removed via line (15), and passed to sulfur recovery unit (16). Spent air is removed via line (17). Regenerated reactant solution is returned via line (18) to contactor (2).

The following experiments illustrate the effect of the additives of the invention. The values given herein relating to temperatures, pressures, compositions, etc., should be considered merely exemplary and not as delimiting the invention.

EXAMPLE 1

H$_2$S enters a contact vessel into which also enters an aqueous mixture containing 5.4 percent by weight Fe (based on the total weight of the mixture) as the Fe(III) chelate of N-(2-hydroxyethyl)ethylenediamine triacetic acid. The ligand was supplied in 10 percent molar excess, basis the iron, and the pH of the system was 6. The pressure of the feed gas is about 0 psig, and the temperature of the mixture is about 35° C. A contact time of about 120 seconds is employed. In the mixture, the H$_2$S is converted to elemental sulfur by the Fe(III) chelate, Fe(III) chelate in the process being converted to the Fe(II) chelate. The sulfur produced is very fine and difficult to separate from solution, and has a mean volume diameter ($\mu$) by Coulter Counter of 2.3.

EXAMPLE 2

A procedure similar to Example 1 was followed, except that about 4.4 percent of Fe as the Fe(III) chelate of N-(2-hydroxyethyl)ethylenediamine triacetic acid was used, and the solution also contained 3.4 percent phosphate, added as disodium hydrogen phosphate heptahydrate, and 4.0 percent thiosulfate added as sodium thiosulfate pentahydrate (all percentages by weight, based on the total weight of the mixture). The sulfur produced has a mean diameter ($\mu$) by Coulter Counter of 6.9.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is, of course, well within the scope of the invention.

Again, as will be understood by those skilled in the art, the solutions or mixtures employed may contain other materials or additives for given purposes.

What is claimed is:

1. A process for the removal of H$_2$S from a sour gaseous stream comprising
   (a) contacting the sour gaseous stream in a contacting zone with an aqueous reaction solution at a temperature below the melting point of sulfur, the reaction solution comprising an effective amount of an oxidizing polyvalent metal chelate of an acid having the formula

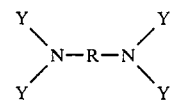

wherein
from two to four of the groups Y are selected from acetic and propionic acid groups;
from zero to two of the groups Y are selected from 2-hydroxyethyl, 2-hydroxy propyl, and

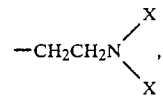

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, said phosphate and thiosulfate ions being present in a molar ratio of from 0.5 to 3:1, and producing a sweet gas stream and an aqueous solution containing crystalline sulfur and reduced reactant;
   (b) removing crystalline sulfur from the aqueous solution;
   (c) regenerating the aqueous solution having reduced sulfur content in a regenerating zone and producing regenerated reactant in said solution; and
   (d) returning regenerated solution from step (c) to the contacting zone.

2. The process of claim 1 wherein the stream from which the H$_2$S is removed is selected from naturally occurring gases, synthesis gases, process gases, and fuel gases.

3. The process of claim 1 wherein the sour gaseous stream is selected from natural gas, a stream derived from the gasification of coal, or a hydrocarbon stream.

4. A process for the removal of H$_2$S from a sour gaseous stream comprising
   (a) contacting the sour gaseous stream in a contacting zone with an aqueous reaction solution at a temperature below the melting point of sulfur, the reaction solution comprising an effective amount of an oxidizing polyvalent metal chelate of an acid having the formula

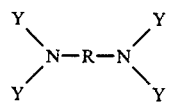

wherein
from two to four of the groups Y are selected from acetic and propionic acid groups;
from zero to two of the groups Y are selected from 2-hydroxyethyl, 2-hydroxy propyl, and

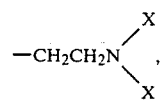

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, said phosphate and thiosulfate ions being present in a molar ratio of from 0.5 to 3:1, and producing a sweet gas stream and an aqueous solution containing crystalline sulfur and reduced polyvalent metal chelate or chelates of said acid;
(b) regenerating the aqueous solution in a regenerating zone and producing a regenerated reactant in said solution;
(c) removing at least a portion of the crystalline sulfur from the regenerated solution;
(d) returning regenerated reaction solution having reduced sulfur content to the contacting zone.

5. The process of claim 4 wherein the stream from which the H₂S is removed is selected from naturally occurring gases, synthesis gases, process gases, and fuel gases.

6. The process of claim 4 wherein the sour gaseous stream is selected from natural gas, a stream derived from the gasification of coal, or a hydrocarbon stream.

7. A process for the removal of H₂S from a sour gaseous stream comprising
(a) contacting the sour gaseous stream in a contacting zone at a temperature below the melting point of sulfur with a lean CO₂-selective absorbent mixture containing an effective amount of an oxidizing polyvalent metal chelate of an acid having the formula

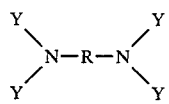

wherein
from two to four of the groups Y are selected from acetic and propionic acid groups;
from zero to two of the groups Y are selected from 2-hydroxyethyl, 2-hydroxy propyl, and

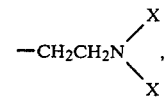

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, said phosphate and thiosulfate ions being present in a molar ratio of from 0.5 to 3:1, and producing a sweet gas stream and an absorbent admixture containing absorbed CO₂, crystalline sulfur and reduced reactant;
(b) removing crystalline sulfur from the absorbent admixture, and leaving a solution containing absorbed CO₂ and reduced reactant;
(c) stripping the solution containing absorbed CO₂ and reduced reactant and regenerating said reduced reactant, producing a lean CO₂-selective absorbent solution containing regenerated reactant; and
(d) returning lean CO₂ selective absorbent solution containing regenerated reactant to the contacting zone.

8. A process for the removal of H₂S from a sour gaseous stream comprising
(a) contacting the sour gaseous stream in a contacting zone at a temperature below the melting point of sulfur with a lean CO₂-selective absorbent mixture containing an effective amount of an oxidizing polyvalent metal chelate of an acid having the formula

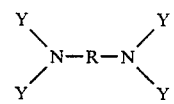

wherein
from two to four of the groups Y are selected from acetic and propionic acid groups;
from zero to two of the groups Y are selected from 2-hydroxyethyl, 2-hydroxy propyl, and

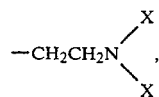

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, said phosphate and thiosulfate ions being present in a molar ratio of from 0.5 to 3:1, and producing a sweet gas stream and an absorbent admixture containing absorbed CO$_2$, crystalline sulfur and reduced reactant;

(b) removing crystalline sulfur from the absorbent admixture, and leaving a solution containing absorbed CO$_2$ and reduced reactant;

(c) stripping the solution containing absorbed CO$_2$ and reduced reactant, and then regenerating said reduced reactant, producing a lean CO$_2$-selective absorbent solution containing regenerated reactant; and (d) returning lean CO$_2$-selective absorbent solution containing regenerated reactant to the contacting zone.

9. A process for the removal of H$_2$S from a sour gaseous stream comprising (a) contacting the sour gaseous stream in a contacting zone at a temperature below the melting point of sulfur with a lean CO$_2$-selective absorbent mixture containing an effective amount of an oxidizing polyvalent metal chelate of an acid having the formula

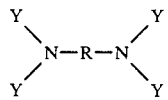

wherein
from two to four of the groups Y are selected from acetic and propionic acid groups;
from zero to two of the groups Y are selected from 2-hydroxyethyl, 2-hydroxy propyl, and

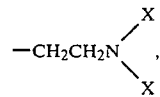

wherein
X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof; and an amount of phosphate and thiosulfate ions effective to improve sulfur quality, said phosphate and thiosulfate ions being present in a molar ratio of from 0.5 to 3:1, and producing a sweet gas stream and an absorbent admixture containing absorbed CO$_2$, crystalline sulfur and reduced reactant;

(b) stripping absorbent mixture containing CO$_2$ and removing CO$_2$ from said absorbent mixture, producing a stripped absorbent admixture containing reduced reactant;

(c) removing crystalline sulfur from said stripped absorbent admixture;

(d) regenerating said reactant, producing a lean CO$_2$ selective absorbent solution containing regenerated reactant; and (e) returning lean CO$_2$-selective absorbent solution containing regenerated reactant to the contacting zone.

10. A composition comprising (A) a polyvalent metal chelate of an acid having the formula

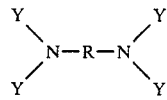

wherein
from two to four of the groups Y are selected from acetic and propionic acid groups;
from zero to two of the groups Y are selected from 2-hydroxyethyl, 2-hydroxy propyl, and

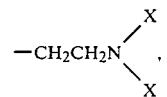

wherein
X is selected from acetic acid and propionic acid groups; and
R is ethylene, propylene or isopropylene or alternatively cyclohexane or benzene where the two hydrogen atoms replaced by nitrogen atoms are in the 1,2 position, and mixtures thereof;

(B) an alkali metal or ammonium phosphate, polyphosphate, -hydrogen or -dihydrogen phosphate; and (C) an alkali metal thiosulfate, bisulfite, dithionite or tetrathionite, the molar ratio of (A) to (C) being from about 1 to 6:1, and the molar ratio of (B) to (C) being from about 0.5 to 3:1.

11. The method of any one of claims 1 through 9 wherein the oxidizing polyvalent metal chelate is the ferric chelate of N-(2-hydroxyethyl)ethylenediamine triacetic acid.

12. The method of any one of claims 1 through 9 wherein the oxidizing polyvalent metal chelate is the ferric chelate of N-(2-hydroxyethyl)ethylenediamine triacetic acid, phosphate ions are supplied from sodium, potassium, or lithium phosphate, polyphosphate, -hydrogen or -dihydrogen phosphate, and mixtures thereof; and thiosulfate ions are supplied as sodium, potassium, or lithium thiosulfate, bisulfite, dithionite, or tetrathionite, and mixtures thereof.

* * * * *